United States Patent [19]
Takigami

[11] Patent Number: 5,138,498
[45] Date of Patent: Aug. 11, 1992

[54] RECORDING AND REPRODUCTION METHOD FOR A PLURALITY OF SOUND SIGNALS INPUTTED SIMULTANEOUSLY

[75] Inventor: Kohtaro Takigami, Tokyo, Japan

[73] Assignee: Fuji Photo Film Co., Ltd., Kanagawa, Japan

[21] Appl. No.: 485,853

[22] Filed: Feb. 22, 1990

Related U.S. Application Data

[63] Continuation of Ser. No. 111,189, Oct. 22, 1987, abandoned.

[30] Foreign Application Priority Data

Oct. 22, 1986 [JP] Japan .................. 61-249451

[51] Int. Cl.$^5$ .......................... G11B 5/00; G11B 5/02
[52] U.S. Cl. ............................................ 360/8; 360/18
[58] Field of Search .................................. 360/8, 18

[56] References Cited

U.S. PATENT DOCUMENTS 4,544,958 10/1985 Okada ............................. 360/8
4,763,206 8/1988 Takahashi et al. ............... 360/8

FOREIGN PATENT DOCUMENTS 58-159079 9/1983 Japan .

Primary Examiner—Vincent P. Canney

[57] ABSTRACT

A recording method is provided for simultaneously inputted sound signals of a plurality of types that are respectively time-base-compressed, rearranged serially according to types, and recorded on a track of a magnetic disk. In a reproduction method, time-base-compressed sound signals of a plurality of signal types are reproduced serially from a magnetic disk, and rearranged in parallel according to the signal types in the time base expansion.

24 Claims, 11 Drawing Sheets

RECORDING AND REPRODUCTION METHOD FOR A PLURALITY OF SOUND SIGNALS INPUTTED SIMULTANEOUSLY

This application is a continuation of application Ser. No. 07/111,189 filed on Oct. 22, 1987, now abandoned.

BACKGROUND OF THE INVENTION

1. Field of the Invention

This invention relates to a method for recording simultaneously inputted sound signals of a plurality of types such as stereo audio signals on a magnetic disk such as a floppy disk, and a method for reproducing such signals.

2. Description of the Prior Art

Devices are known for recording a video signal of a still picture on a magnetic disk, such as an electronic still camera, and one which uses a floppy disk, which is also called a "video floppy", for use in an electronic still camera, of approximately 47 mm in diameter and approximately 40 μm in thickness which is the standard and practical use. The floppy disk of this type is rotated at a speed of 3,600 rpm to record 50 frames of still pictures on 50 tracks in a field recording mode, or 25 frames of still pictures on 50 tracks in a frame recording mode. The track has a width of 60 μm, with a track pitch of 100 μm, and a guard band of 40 μm in width is provided between the tracks. Reproduced pictures may be displayed on a monitor such as a television screen, or may be printed out by a printer to obtain hard copies.

A time base compression is used for recording a sound signal on such a floppy disk, and a time base expansion is used for reproducing the signal from the floppy disk. Otherwise, since the floppy disk makes one turn in 1/60 second, only 1/60 second of signal can be recorded per track. By compressing the time base to 1/640, for example, a sound signal of about 10 seconds can be recorded on a track. The sound signal includes a variety of signals within an audio frequency band, such as a description of the still picture recorded, background music for the reproduced picture, and background sound when photographing by an electronic still camera.

These sound signals have been conventionally recorded in a monaural system.

FIG. 11 is a block diagram of a typical monaural sound signal recording system, and FIG. 12 is a block diagram of a monaural sound signal reproduction system.

Referring to FIG. 11, a sound signal 3 supplied from a microphone 1 to an input terminal 2 is passed through a low-pass filter (LPF) 4 and a noise reduction circuit (NR) 5, and then inputted to a time base compression device 6. The time base compression device 6 includes an A/D converter 7, a RAM (random access memory) 8, a D/A converter 9, an address counter 10, a write clock generator 11, and a read clock generator 12. The address counter 10 is connected to a recording start switch 13 and a PG detecting device 14 which outputs a PG signal 14a at a rate of one pulse per one turn of a video floppy 19 to detect the rotational phase of the video floppy 19. For a time compression factor of M, the frequency of a read clock signal 12a is set to M-times a frequency fs of a write clock signal 11a, that is, M·fs. A sound signal 5a from the noise reduction circuit 5 is converted to a digital sound signal 7a by the A/D converter 7 with a sampling frequency of fs. The digital sound signal 7a is stored in the RAM 8 after the recording start switch 13 is turned on and the address is advanced by the address counter 10 using a clock frequency of fs. Numeral 10a indicates an address signal. After the digital sound signal 7a is recorded in a predetermined area of the RAM 8, the address counter 10 advances the address in synchronization with a clock frequency of M·fs for reading the contents of the RAM 8. A digital signal 8a read from the RAM 8 is converted to an analog signal 9a by the D/A converter 9 using a clock frequency of M·fs. Thus, the obtained analog signal 9a is the sound signal 3 applied to the input terminal 2 having a time base that is compressed to 1/M.

The time-compressed analog signal 9a is emphasized in the high frequency range by a pre-emphasis circuit 15, modulated by a frequency modulator 16, and then recorded on an adequate track of the floppy disk 19 through a recording amplifier 17 and a magnetic head 18. Numeral 20 indicates a motor for rotating the floppy disk 19.

The time compression factor is determined by a frequency band which can be recorded on the floppy disk 19 and an upper limit frequency required for the sound signal 3 to be recorded. Electronic still cameras or the like can record a signal which is obtained by FM modulating a 6 MHz carrier with a sound signal of 3.2 MHz after compression, on a floppy disk which rotates at a speed of 3,600 rpm. Where the upper limit frequency is fv (KHz), the time compression factor M is given as M=3,200/fv. A time T of the sound signal to be recorded is given as T=M·1/60=3,200/60fv. Table 1 shows the values for fv=2.5 KHz, 5 KHz, and 10 KHz.

TABLE 1

| Recording mode | Upper limit frequency fv (KHz) | Recording time T (sec) | Compression factor M (times) | Write clock fs(KHz) example | Read clock M.fs(MHz) example |
|---|---|---|---|---|---|
| 10 sec | 5 | about 10 | 640 | 10 | 6.4 |
| 5 sec | 10 | about 5 | 320 | 20 | 6.4 |
| 20 sec | 2.5 | about 20 | 1,280 | 5 | 6.4 |

In the reproduction, referring to FIG. 12, when a reproduction switch 32 is turned on, a signal 21a is outputted from a magnetic head 21 to an amplifier 22, demodulated by a frequency demodulator 23, suppressed of its high frequency range by a de-emphasis circuit 24, and inputted to a time base expansion circuit 25. The time base expansion circuit 25 has an A/D converter 26, a RAM 27, a D/A converter 28, an address counter 29, a write clock generator 30, and a read clock generator 31. The address counter 29 is connected with the reproduction switch 32 and a PG detecting device 33 which outputs a PG signal 33a at a rate of one pulse per one turn. The frequency of a write clock signal 30a is the same as the frequency of the read clock signal 12a in the time base compression device 6 of the recording system shown in FIG. 11, that is M·fs. The frequency of a read clock signal 31a is the same as the frequency of the write clock signal 11a in the time base compression device 6, that is fs.

A time-compressed analog sound signal 24a obtained in the de-emphasis circuit 24 is converted to a digital signal 26a by the A/D converter 26 with a sampling frequency of M·fs. The digital signal 26a is stored in the RAM 27 with the address advanced by the address counter 29 using a clock frequency of M·fs which is synchronized with a PG signal 33a from the PG detecting device 33. Numeral 29a indicates an address signal. When the digital signal 26a is completely stored in a predetermined area of the RAM 27, the address counter 29 advances the address by a clock frequency of fs for reading the contents of the RAM 27. A digital signal 27a read from the RAM 7 is converted to an analog signal 28a by the D/A converter 28 using a clock frequency of fs. Thus, the obtained analog signal 28a is a sound frequency band signal having the original time base. The sound signal 28a is applied through a low-pass filter 34, a noise-reduction circuit 35, and an amplifier 36, to a speaker 37, and is outputted as sound.

As described above, in the prior art electronic still cameras or the like, sound signals have been recorded only in a monaural mode on a magnetic disk. There is a strong desire for recording sound in a stereo system. Further, there is a requirement for simultaneously recording two or more sound signals of any type, not restricted to stereo signals.

However, when a plurality of sound signals are recorded on a magnetic disk, the sound signals are required to be interchangeable for allowing reproduction by typical monaural reproduction devices.

SUMMARY OF THE INVENTION

With a view to obviate all of the defects of the typical sound recording methods described above, it is a primary object of the present invention to provide a method for recording simultaneously inputted sound signals of a plurality of types such as stereo audio signals on a magnetic disk such as a video floppy, and a method for reproducing the signals.

In accordance with the present invention which attains the above object, there is provided a simultaneous recording method for a plurality of sound signals which includes converting analog sound signals inputted in parallel of a plurality of types into digital signals, storing the digital signals in a RAM or RAMs of a time base compression device, reading the digital signals serially according to types from the RAM or RAMs at a speed higher than the speed for writing, converting the read digital signals into analog signals, modulating the signals based on the analog signals inputted in parallel of a plurality of types, time-base-compressed and serially arranged, and recording the modulated signals on a magnetic disk.

Also, according to the present invention, a simultaneous reproduction method for a plurality of sound signals is provided which includes reproducing analog signals having time-base-compressed sound signals of a plurality of types arranged serially according to types from a magnetic disk, converting the reproduced analog signals into digital signals, storing the converted digital signals in a RAM or RAMs of a time base expansion device, reading the digital signals in parallel according to types from the RAM or RAMs at a speed lower than the speed for writing, and converting the read digital signals into analog signals to obtain sound signals of a plurality of types having a restored time base.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
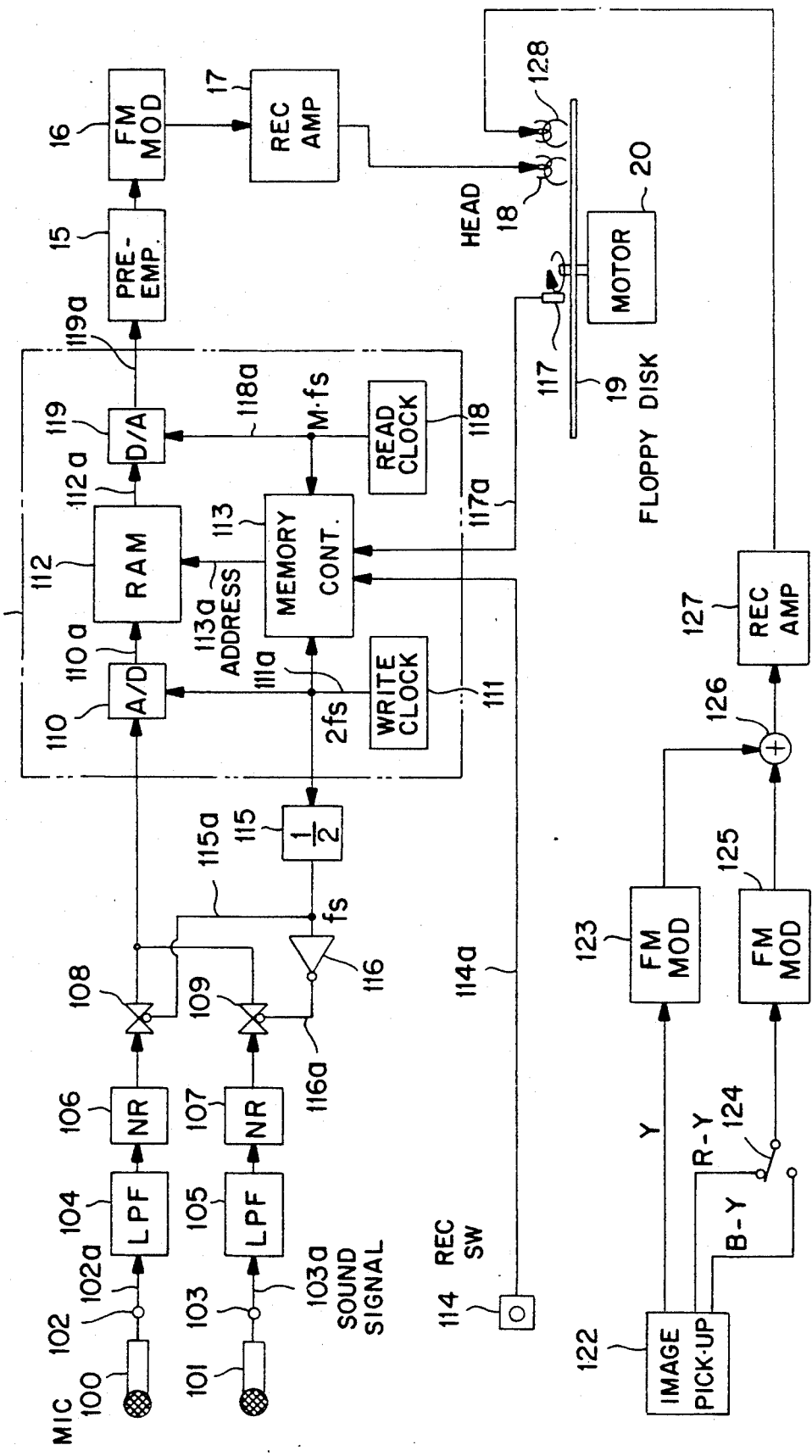
FIGS. 1, 4, 6, 7, and 8 are block diagrams showing respective embodiments of the recording system according to the present invention.

In the recording method according to the present invention, a plurality of simultaneously inputted sound signals are time-compressed and recorded, and are serially rearranged according to the signal types, on a track of a magnetic disk. When the magnetic disk recorded with the sound signals is reproduced using a typical monaural device, the sound signals are reproduced successively according to the signal types without mixing up the sound signals for a plurality of signal types.

In addition, with the reproduction method according to the present invention, a plurality of time-compressed sound signals are serially reproduced from the magnetic disk, and rearranged in parallel by the time base expansion.

In the recording method according to the present invention, when sound signals for a plurality of types are converted to digital signals, the individual sound signals are converted into digital signals by time-division using a common A/D converter, or the signals are converted into digital signals using different A/D converters.

When the common A/D converter is used, the digital signals are stored in a single RAM, and data is read from the RAM sequentially in the order of types by changing an order of addresses from the order for recording. The read digital signals are then converted into analog signals by a single D/A converter.

There are two methods when different A/D converters are used for individual signal there. Method is to store the digital signals in a single RAM, and the second method is to store the signals separately in independent RAMs according to the types. In the first method, digital signals from individual A/D converters are stored in a single RAM by time-division, and then processed as in the case with the common A/D converter. The second method is further divided into two steps. In the first step, digital signals are read sequentially from individual RAMs, and then converted to analog signals by a common D/A converter. In the second step digital signals are read sequentially from individual RAMs, and then converted to analog signals by different D/A converters for the individual RAMs, and outputs of the D/A converters are sequentially selected.

The reproduction method according to the present invention includes two steps. The first step stores the digital signals in independent RAMs according to types, and the second step stores the digital signals in a common RAM. In the first step, the digital signals from an Frequencies of these clock signals depend on the recording time of the sound signals 102a and 103a, and examples of these frequencies are shown in Table 2.

TABLE 2

| Recording time per unit sound signal | Recording time sec/track | Analog switch clock fs | Write clock 2fs | Read clock M·fs | Compression factor M (times) | Upper limit freq. fv |
| --- | --- | --- | --- | --- | --- | --- |
| Abt. 5 sec | Abt. 10 sec | 10KHz | 20KHz | 6.4MHz | 640 | 5KHz |
| Abt. 10 sec | Abt. 20 sec | 5KHz | 10KHz | 6.4MHz | 1280 | 2.5KHz |

A/D converter are written into the corresponding RAMs according to types. After writing, the digital signals are simultaneously read from the individual RAMs and inputted to different D/A converters. In the second step, the digital signals from an A/D converter are written into the common RAM. Then, the digital signals of individual types are read by time-division in an address order different from the order for writing, and the read digital signals are selectively inputted to the D/A converters for individual types.

The magnetic disk used for recording typically includes a floppy disk such as a video floppy according to the electronic still camera specification.

The present invention will now be described in detail with reference to embodiments shown by FIGS. 1 to 10.

EMBODIMENT 1

FIG. 1 is a block diagram of a recording system. A floppy disk 19 is used as a magnetic disk. The floppy disk 19, which is a video floppy according to the electronic still camera specification, is rotated at a speed of 3,600 rpm.

The recording system has two audio input terminals 102 and 103, which are connected with two audio-frequency analog signal sources such as microphones 100 and 101. Signals 102a and 103a at the input terminals 102 and 103 are applied to analog switches 108 and 109, respectively, through low-pass filters (LPF) 104 and 105, and noise reduction circuits (NR) 106 and 107, respectively. The two analog switches 108 and 109 are alternately turned on and off by clock signals 115a and 116a having a frequency of fs for supplying signals from the two input terminals 102 and 103 to a single A/D converter 110 by time-division. An input signal is converted to a digital signal 110a by the A/D converter 110 using a clock signal 111a having a frequency of 2 fs supplied from a clock generator 111, and applied to a RAM (random access memory) 112 of a time base compression device 200. The RAM 112 stores the digital signal 110a from the A/D converter 110 successively at addresses designated by an address signal 113a from a memory control device 113. The memory control device 113 controls writing and reading of the RAM 112, and has an address counter. The memory control device 113 advances a write address for the RAM 112 after a recording start, switch 114 is turned on in synchronization with the clock signal 111a having a frequency of 2 fs. One analog switch 108 is controlled by a signal 115a which is produced by frequency-dividing the clock signal 111a to one-half by a frequency divider 115. The clock signal 115a is phase-inverted by an inverter 116 into a signal 116a which controls the other analog switch 109.

After the digital signal 110a from the A/D converter 110 is completely stored in the RAM 112, the memory control device 113 advances the read address using a clock signal 118a having a frequency of M·fs in synchronization with a PG signal 117a of one pulse per one turn of the disk 19 from a PG detecting device 117 for reading the contents of the RAM at a high speed. A D/A converter 119 converts a digital signal 112a from the RAM 112 into an analog signal 119a. The analog signal 119a, which has been time-compressed, is recorded on the floppy disk 19 through a pre-emphasis circuit 15, a frequency modulator 16, a recording amplifier 17, and a magnetic head 18. Numeral 118 indicates a clock generator.

Figure 2:
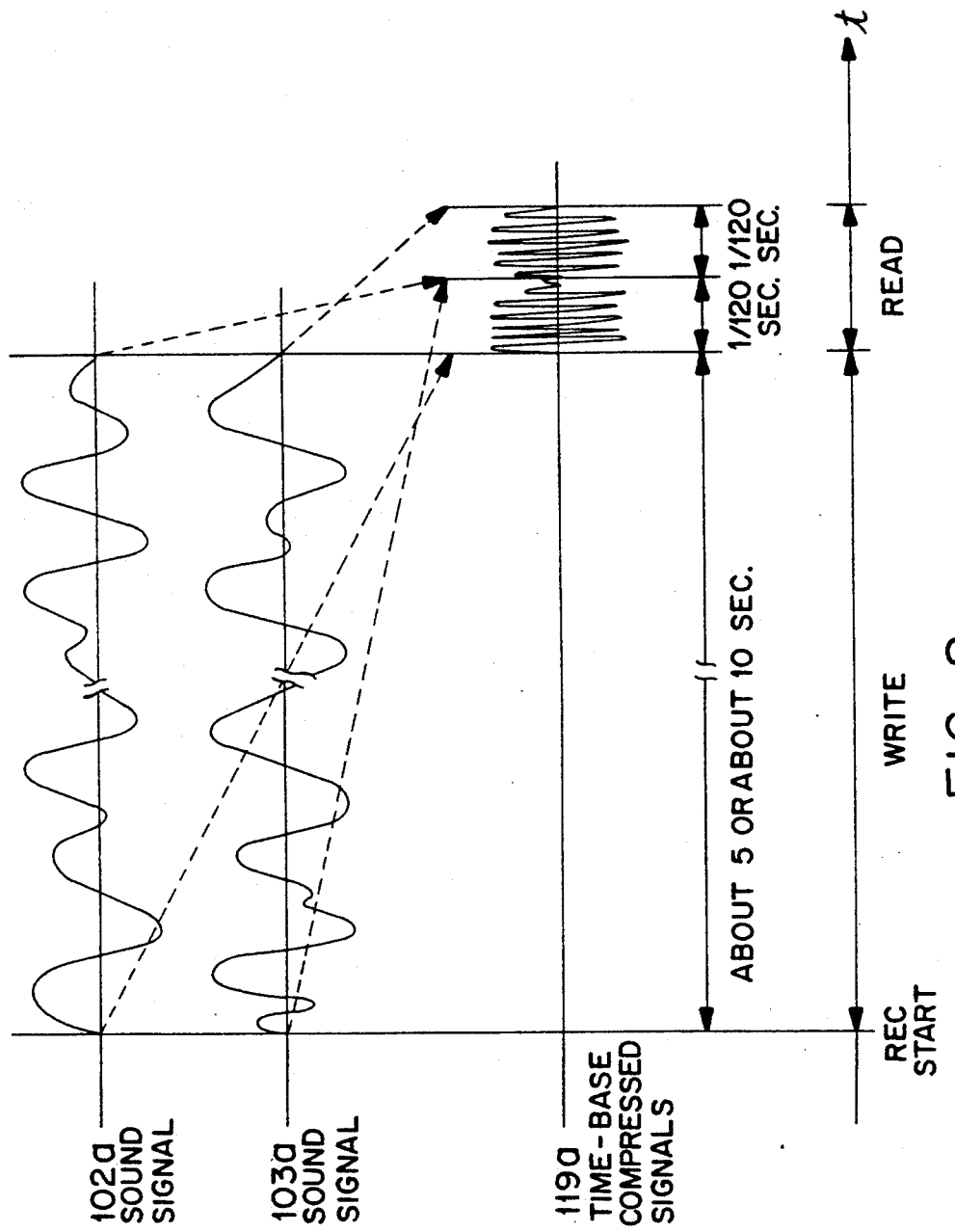
FIG. 2 is a graph showing the operation principle.

However, the order of read addresses for the RAM 112 is different from the order of write addresses. In one example, data corresponding to the sound signal 102a from one input terminal 102 is read first, and then the data corresponding to the sound signal 103a from the other input terminal 103 is read (FIG. 2). The data from the A/D converter is outputted as it is inputted into the RAM 112 when writing, and the date is rearranged and outputted when reading. In another example the RAM 112 is divided into areas for two different types of signals. When writing, the data from the A/D converter is rearranged to be recorded in the areas corresponding to the individual types, and when reading the data is outputted according to the areas.

Figure 3:
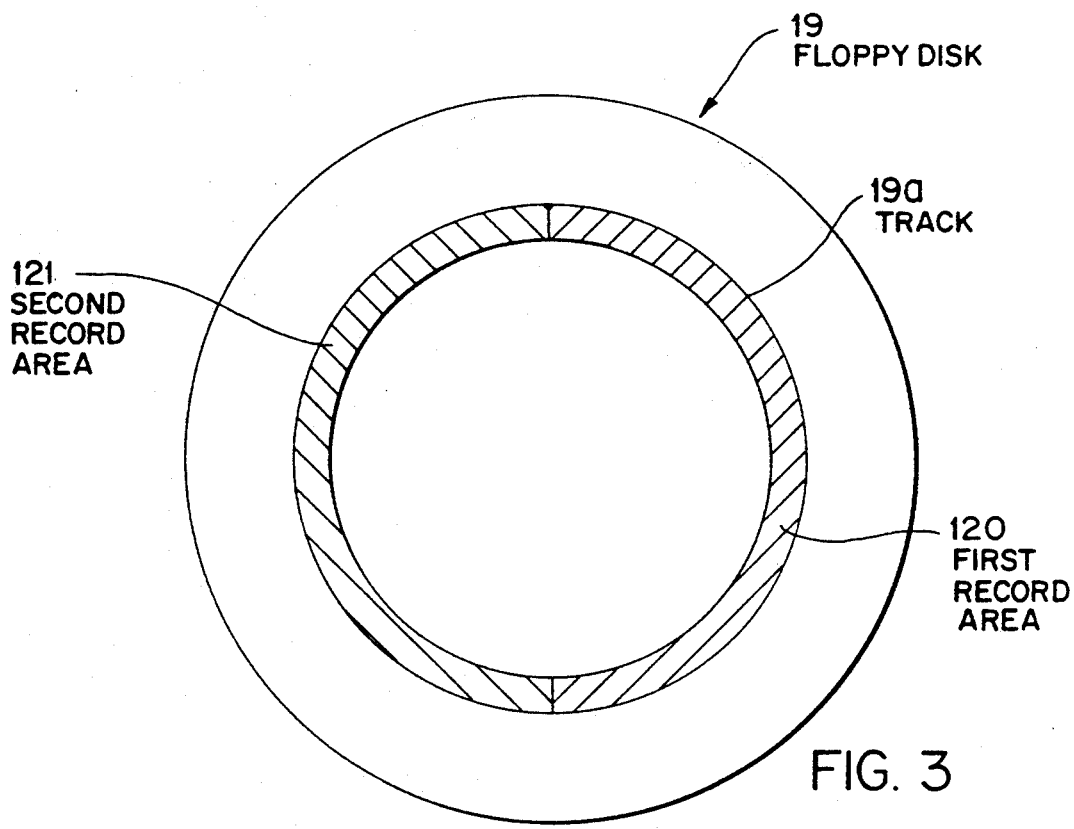
FIGS. 3 and 5 are schematic plane views of floppy disks.

As a result, as shown in FIG. 3, in the floppy disk 19, the sound signal 102a from the input terminal 102 is recorded by time compression on one half-portion 120 of a track 19a. Then, the sound signal 103a from the input terminal 103 is recorded by time compression on the other half-portion 121.

Figure 12:
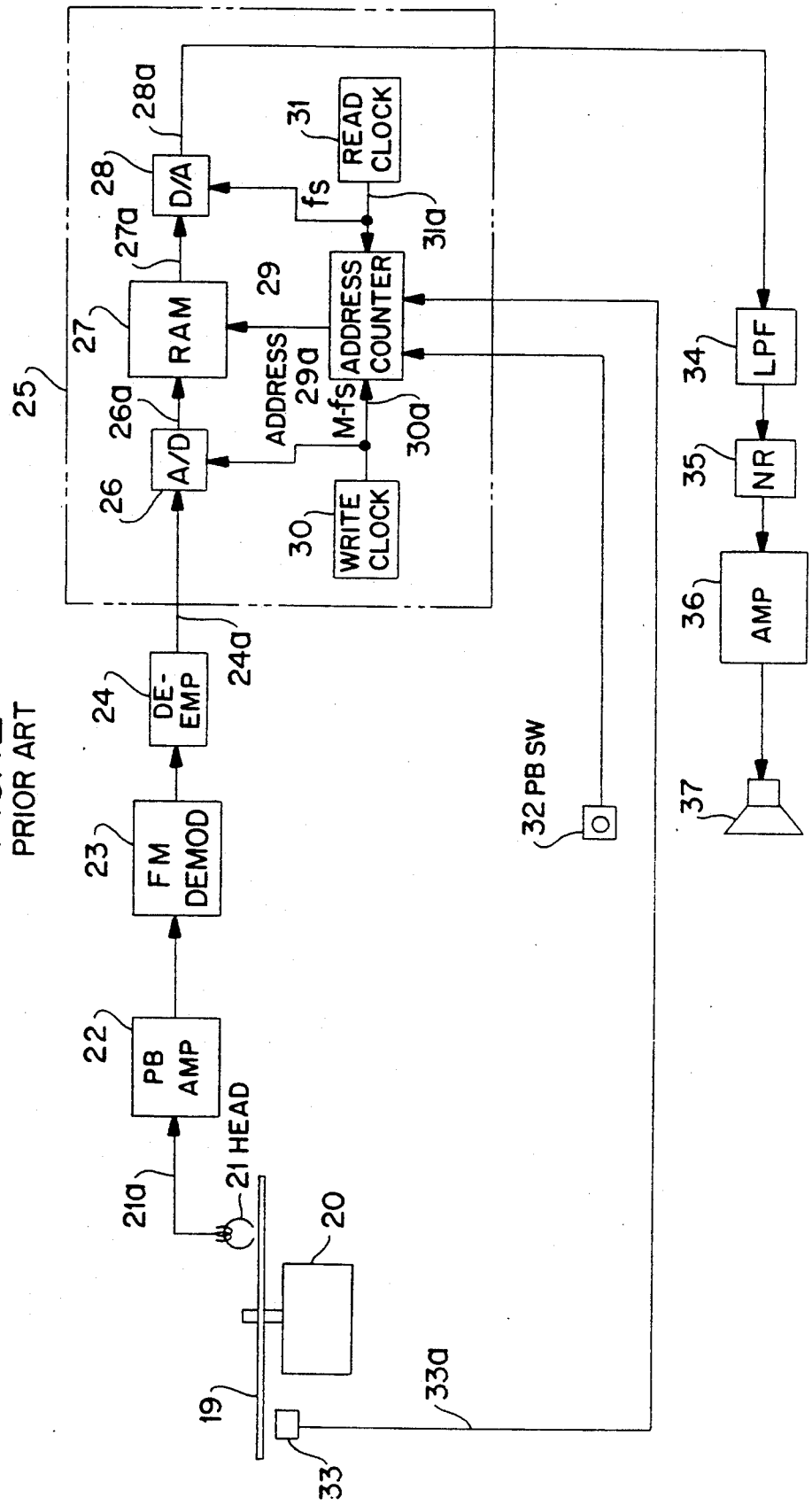
FIG. 12 is a block diagram of a typical reproduction system.

Suppose that the magnetic disk 19 recorded serially with two sound signals as shown in FIG. 3 is reproduced by a typical monaural reproduction system, as shown in FIG. 12. Assuming that recording is performed in a 5-second recording time mode in Table 2, the reproduction system in FIG. 12 is operated in a 10-second mode, where fs=10 KHz. Thus, sound recorded through the input terminal 102 is first outputted for about 5 seconds from a speaker 37 of the reproduction system, and then a sound recorded through the input terminal 103 is outputted for about 5 seconds. Unnecessary sound can be cut off by operating a switch.

A video signal is recorded on the floppy disk 19 by a conventional method known in the art. In FIG. 1, numeral 122 indicates a camera system, numeral 123 indicates a frequency modulator for a luminance signal Y, numeral 124 indicates a switch for the line-sequentialization of two color difference signals R-Y and B-Y, numeral 125 indicates a frequency modulator for a line-sequentialized color difference signal, numeral 126 indicates a synthesizer, numeral 127 indicates a recording amplifier, and numeral 128 indicates a magnetic head.

EMBODIMENT 2

Figure 4:
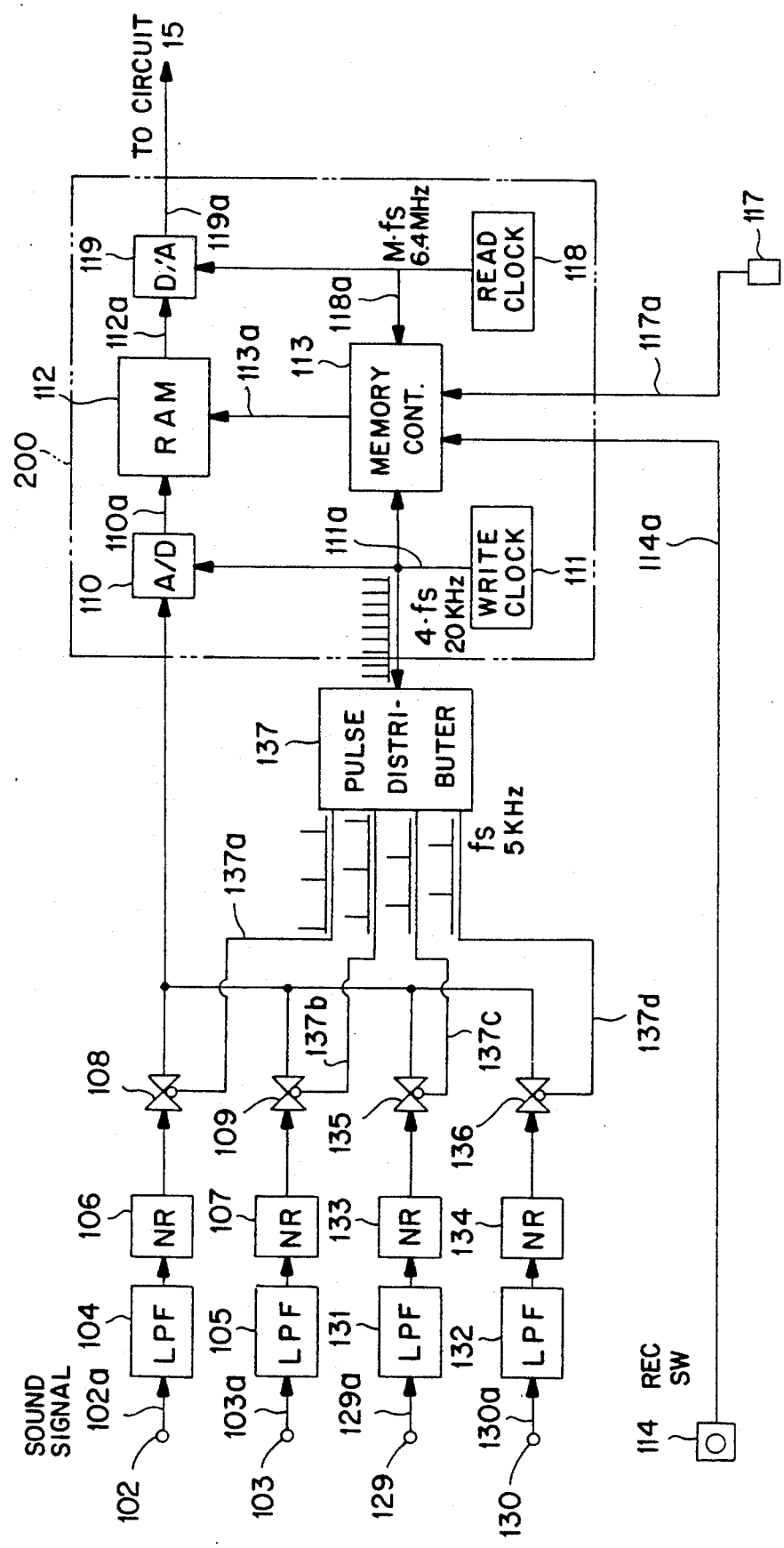

Next, as a modification of Embodiment 1 (FIG. 1), an example of a recording system having four sound signal input terminals 102, 103, 129, and 130 will now be described with reference to FIG. 4. However, the pre-emphasis circuit 15 and the following devices are not shown in FIG. 4 because the devices are the same as the devices of FIG. 1. The recording time is set to about 20 seconds/track (about 5 seconds per unit sound signal).

The input terminals 102, 103, 129, and 130 are respectively connected with low-pass filters (LPF) 104, 105, 131, and 132, noise reduction circuits (NR) 106, 107, 133, and 134, and analog switches 108, 109, 135, and 136. The four analog switches 108, 109, 135, and 136 are cyclically turned on by control signals 137a, 137b, 137c, and 137d from a pulse distribution circuit 137 which are different in phase by 90 degrees from each other. Outputs of the analog switches are commonly applied to an A/D converter 110 of a time base compression device 200. The pulse distribution circuit 137 is inputted with a clock signal 111a having a frequency of 4 fs, that is 20 KHz for example, from a clock generator 111, and outputs control signals having a frequency of fs=5 KHz which are different in phase by 90 degrees from each other. The A/D converter 110 converts signals from the analog switches into sequentialized digital signals using the 20 KHz clock signal 111a, which are supplied to the RAM 112. The RAM 112 stores a digital signal 110a from the A/D converter 110 according to an address signal 113a from a memory control circuit 113 in synchronization with the 20 KHz clock signal 111a similar to the first embodiment.

After the completion of writing into the RAM 112, the memory control circuit 113 advances the read address using a clock signal 118a having a frequency of M·fs=6.4 MHz in synchronization with a PG signal 117a, similar to the first embodiment for reading the contents of the RAM 112 at 1,280-times the speed. A read digital signal 112a is converted into an analog signal 119a by a D/A converter 119 using the 6.4 MHz clock signal 118a. The analog signal 119a is recorded on the floppy disk 19 through the pre-emphasis circuit 15, a frequency modulator 16, a recording amplifier 17, and a magnetic head 18 similar to the first embodiment.

Figure 5:
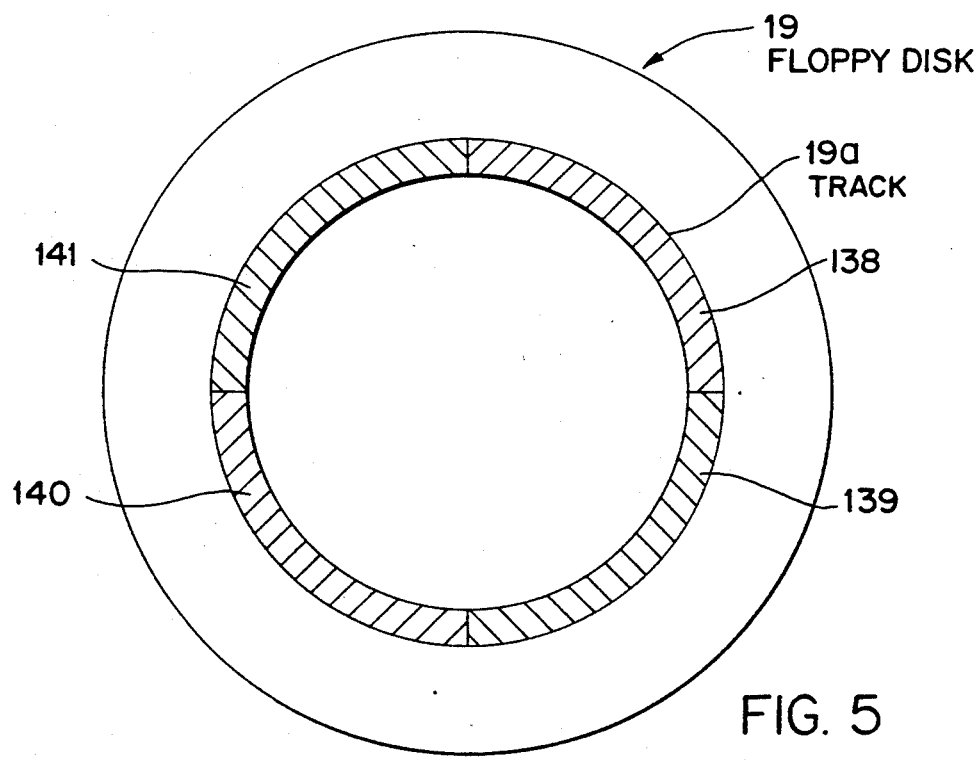

However, the order of read addresses for the RAM 112 is such that all of the data corresponding to the sound signal 102a from the first input terminal 102, for example, is read first, and then the data corresponding to the second input terminal 103, the data corresponding to the third input terminal 129, and the data corresponding to the fourth input terminal 130 are read successively. As a result, the floppy disk 19 is recorded by time compression with sound signals from individual input terminals separately on individual ¼-turn portions 138, 139, 140, and 141 of a track 19a, as shown in FIG. 5.

EMBODIMENT 3

Figure 6:
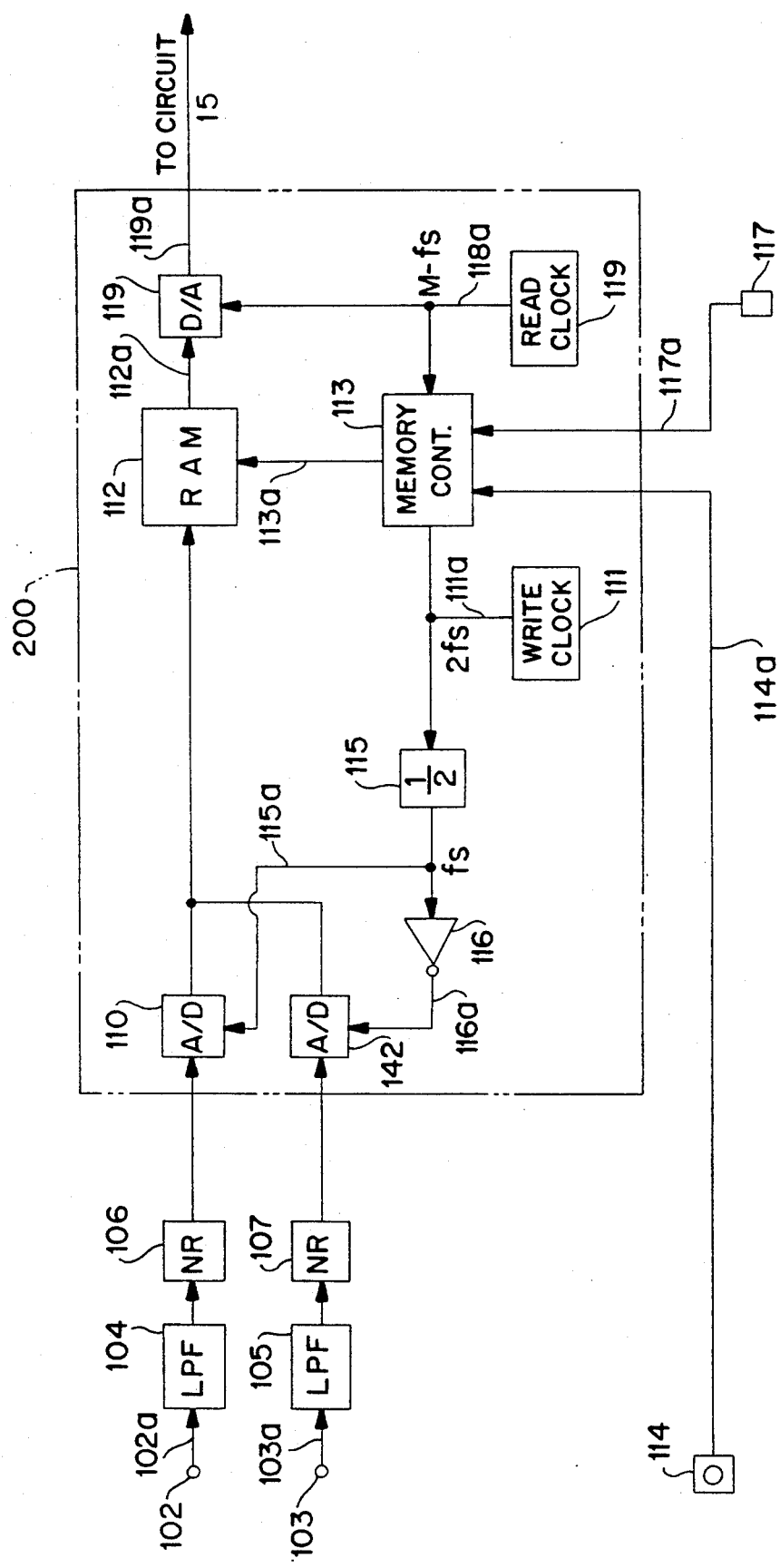

Next, an example of a recording system using independent A/D converters 110 and 142 will be described with reference to FIG. 6, where the pre-emphasis circuit 15 and the following devices are the same as the device of FIG. 1 and are not shown in FIG. 6.

Analog sound signals 102a and 103a from two input terminals 102 and 103 are separately inputted to the A/D converters 110 and 142, respectively, which are independent of each other, through low-pass filters (LPF) 104 and 105, and noise reduction circuits (NR) 106 and 107. The two A/D converters 110 and 142 are operated alternately by clock signals 115a and 116a having frequencies of fs which are different in phase by 180 degrees from each other, and the outputs are applied to a common RAM 112 of a time base compression device 200. The RAM 112 successively stores digital signals from the two A/D converters 110 and 142 according to an address signal 113a from a memory control device 113 in synchronization with a clock signal 111a of a frequency of 2 fs. The clock signal 115a for the one A/D converter 110 is obtained by frequency-dividing the clock signal 111a of the memory control device 113 to one-half, and the clock signal 116a for the other A/D converter 142 is obtained by phase-inverting the clock signal 115a by an inverter 116. Examples of the relation between the recording time and the clock signal frequency are shown in Table 3.

TABLE 3

| Recording time per unit sound signal | Recording time sec/track | A/D conversion clock fs | RAM write clock 2fs | RAM read clock M.fs | Compression factor M (times) | Upper limit freq. fv |
|---|---|---|---|---|---|---|
| Abt. 5 sec | Abt. 10 sec | 10KHz | 20KHz | 6.4MHz | 640 | 5KHz |
| Abt. 10 sec | Abt. 20 sec | 5KHz | 10KHz | 6.4MHz | 1280 | 2.5KHz |

After the completion of writing to the RAM 112, a digital signal 112a is read from the RAM 112 at a high speed, converted into an analog signal 119a by a D/A converter 119, and then recorded on the floppy disk 19, in a similar way as in the first Embodiment.

EMBODIMENT 4

Figure 7:
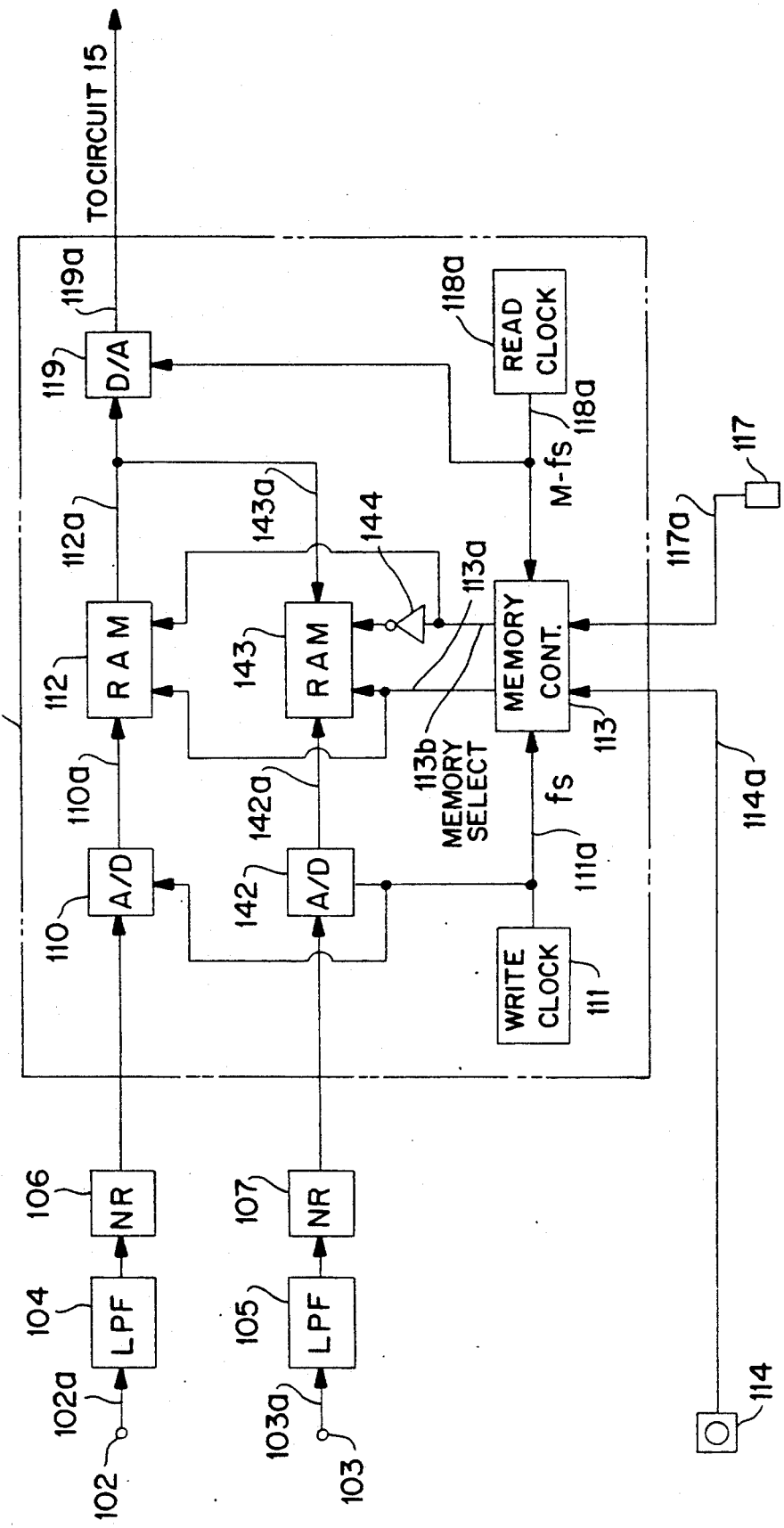

Further, in a modification of the third Embodiment (FIG. 6), an example of the recording system using independent RAMs 112 and 143 will be described with reference to FIG. 7.

In this fourth Embodiment, two sound signals 102a and 103a are simultaneously converted into digital signals 110a and 142a by two A/D converters 110 and 142, and written into the independent RAMs 112 and 143. A clock generator 111 outputs a clock signal 111a having a frequency of fs, which is commonly used for A/D conversion and RAM writing.

Examples of the relation between the recording time and the clock signal frequency are shown in Table 4.

TABLE 4

| Recording time per unit sound signal | Recording time sec/track | A/D conversion RAM write clock fs | Read clock M.fs | Compression factor M (times) | Upper limit freq. fv |
|---|---|---|---|---|---|
| Abt. 5 sec | Abt. 10 sec | 10KHz | 6.4MHz | 640 | 5KHz |
| Abt. 10 sec | Abt. 20 sec | 5KHz | 6.4MHz | 1280 | 2.5KHz |

After the completion of writing to the RAMs 112 and 143, a memory control device 113 selects one RAM 112, for example, using a memory select signal 113b, and advances the read address using a clock signal 118a having a frequency of M·fs in synchronization with a PG signal 117a for reading the contents of the RAM 112 at a high speed. On completion of the reading, the memory control device 113 then selects the other RAM 143, and advances the address using the clock signal 118a for reading the contents of the RAM 143. Digital signals 112a and 143a from the two RAMs 112 and 143 are successively converted by a D/A converter 119 into an analog signal 119a which is recorded on the floppy disk 19. In FIG. 7, numeral 144 indicates an inverter.

EMBODIMENT 5

Figure 8:
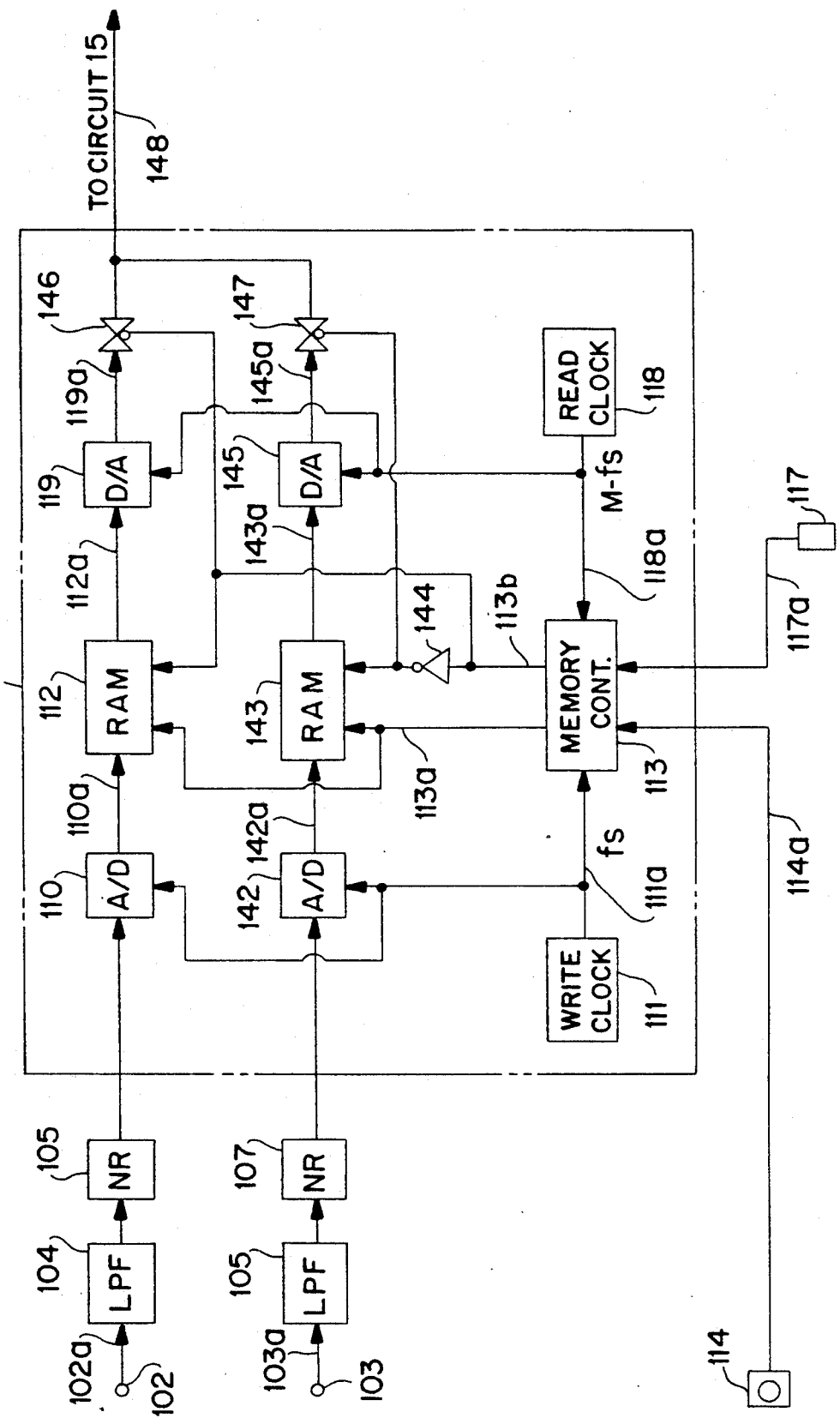

Next, a modification of the fourth Embodiment (FIG. 7) will be described with reference to FIG. 8. This fifth Embodiment differs from the fourth Embodiment only on the point that digital signals 112a and 143a from two RAMs 112 and 143 are converted into analog signals 119a and 145a by separate D/A converters 119 and 145. The outputs of the two D/A converters 119 and 145 are supplied to a common transmission line 148 using two analog switches 146 and 147. The one analog switch 146 is on when RAM 112 is selected, and the other analog switch 147 is on when RAM is selected.

EMBODIMENT 6

Figure 9:
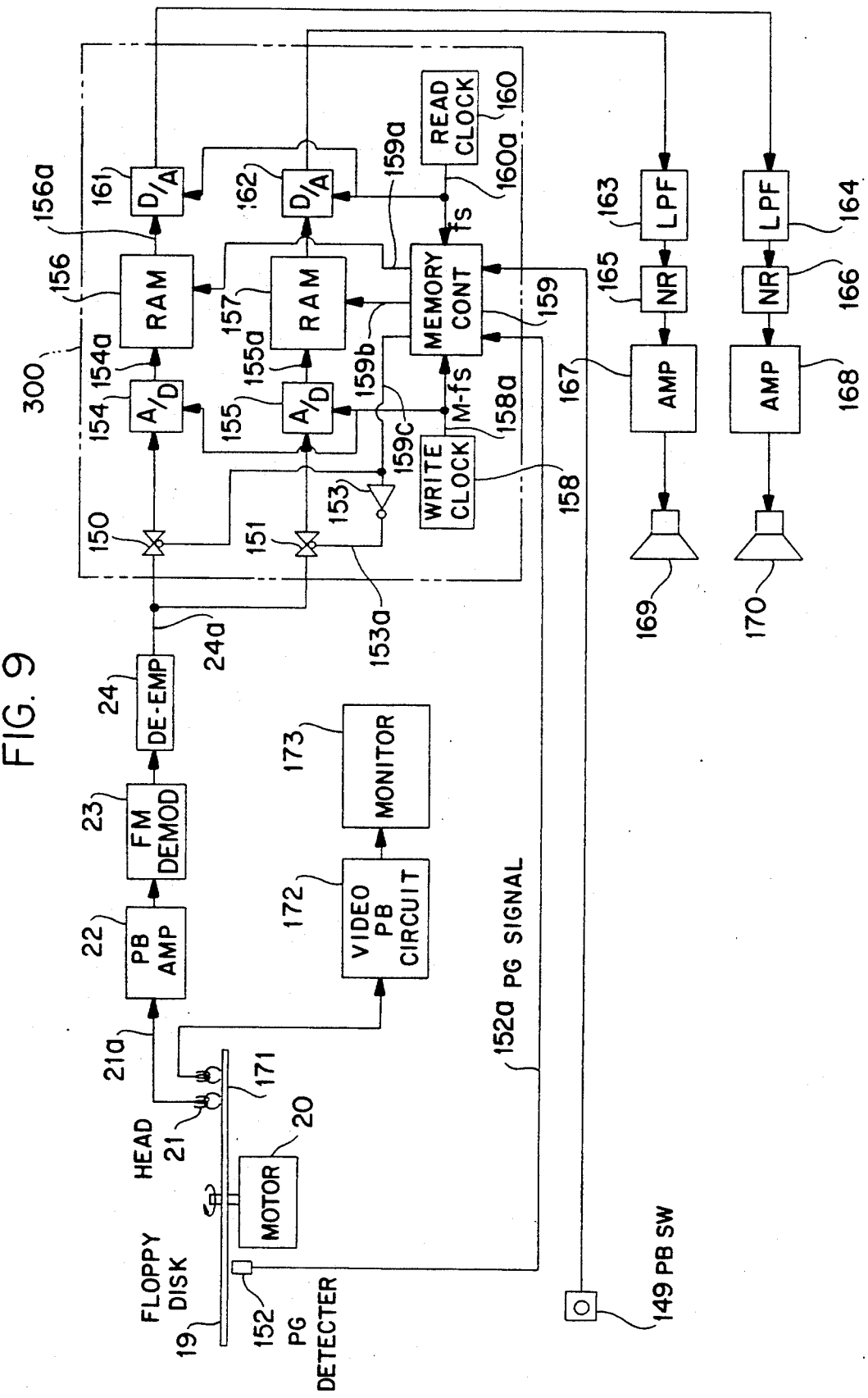
FIGS. 9 and 10 are block diagrams showing embodiments of the reproduction system according to the present invention.

FIG. 9 is a block diagram of a reproduction system. In sixth Embodiment, it is assumed that two time-compressed signals, such as stereo recording, are recorded on a track of the floppy disk 19 as shown in FIG. 3.

When a reproduction switch 149 is turned on, a time-compressed analog signal 24a is inputted to two analog switches 150 and 151 through a magnetic head 21, an amplifier 22, a frequency demodulator 23, and a de-emphasis circuit 24. The two analog switches 150 and 151 are alternately turned on and off by control signals 159c and 153a, respectively, in synchronization with a PG signal 152a of one pulse per one turn of the disk from a PG detecting device 152. The one analog switch 150, for example, is set on for a period of 1/120 second for only passing a signal from a first sound recording area 120 in FIG. 3, and the other analog switch 151 is set on for a period of 1/120 second for only passing a signal of a second sound recording area 121. In FIG. 9, numeral 153 indicates an inverter, which inverts the one switch control signal 159c from a memory control device 159 and outputs the other switch control signal 153a.

Outputs of the analog switches 150 and 151 are converted into digital signals 154a and 155a, respectively, by separate A/D converters 154 and 155, and then stored in separate RAMs 156 and 157. The A/D converters 154 and 155 are operated by a clock signal 158a from a clock generator 158 having a frequency of M·fs. The memory control device 159 has an address counter, which advances the write address of the RAM 156 and 157 using the clock signal 158a. In this case, an address signal 159a for RAM 156 is outputted when the corresponding analog switch 150 is on. Similarly, an address signal 159b for RAM 157 is outputted when the corresponding analog switch 151 is on.

After the completion of writing to the RAMs 156 and 157, the memory control device 159 advances the read addresses of the two RAMs 156 and 157 simultaneously using a clock signal 160a having a frequency of fs from a clock generator 160, to read the contents of the RAMs 156 and 157 parallelly at a low speed. Digital signals from the RAMs 156 and 157 are respectively converted into analog signals by D/A converters 161 and 162, and then applied to speakers 169 and 170 through low-pass filters (LPF) 163 and 164, noise reduction circuits (NR) 165 and 166, and amplifiers 167 and 168.

During reproduction, when the floppy disk 19 is already recorded with a stereo signal, the stereo signal is reproduced in different sounds from the speakers 169 and 170. When two different types of signals other than stereo are recorded on the floppy disk 19, an adequate switch is provided to select a desired sound.

Examples of recording times and clock signal frequencies are shown in Table 5.

TABLE 5

| Reproduction time per unit sound signal | Reproduction time sec/track | Write clock M.fs | Read clock fs | Expansion factor M (times) | Upper limit freq. fv |
|---|---|---|---|---|---|
| Abt. 5 sec | Abt. 10 sec | 6.4MHz | 10KHz | 640 | 5KHz |
| Abt. 10 sec | Abt. 20 sec | 6.4MHz | 5KHz | 1280 | 2.5KHz |

A video signal is reproduced by a conventional method known in the art. In FIG. 9, numeral 171 indicates a magnetic head, numeral 172 indicates a video signal reproduction processing system including demodulators and other devices, and numeral 173 indicates a monitor.

EMBODIMENT 7

Figure 10:
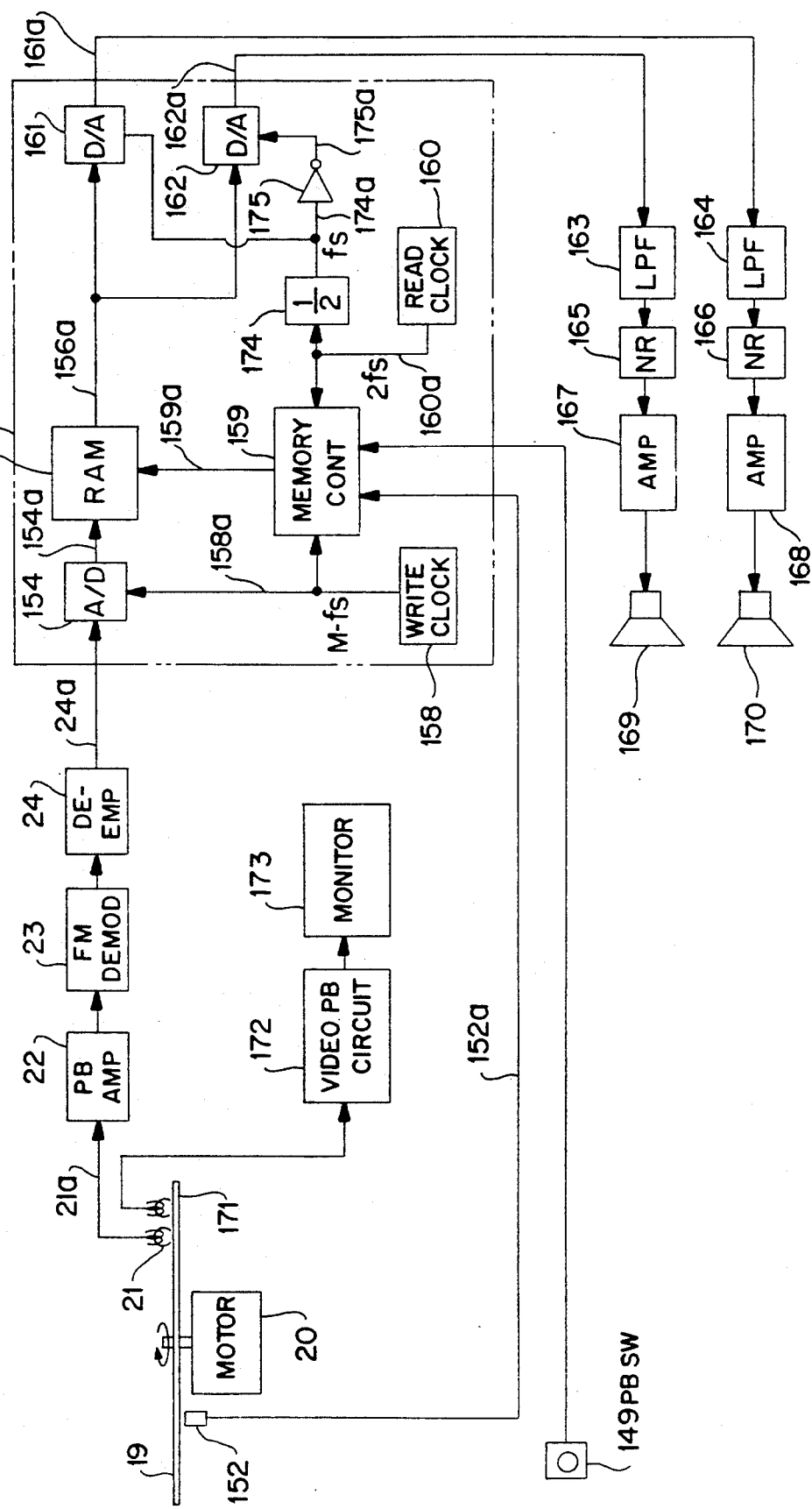
Figure 11:
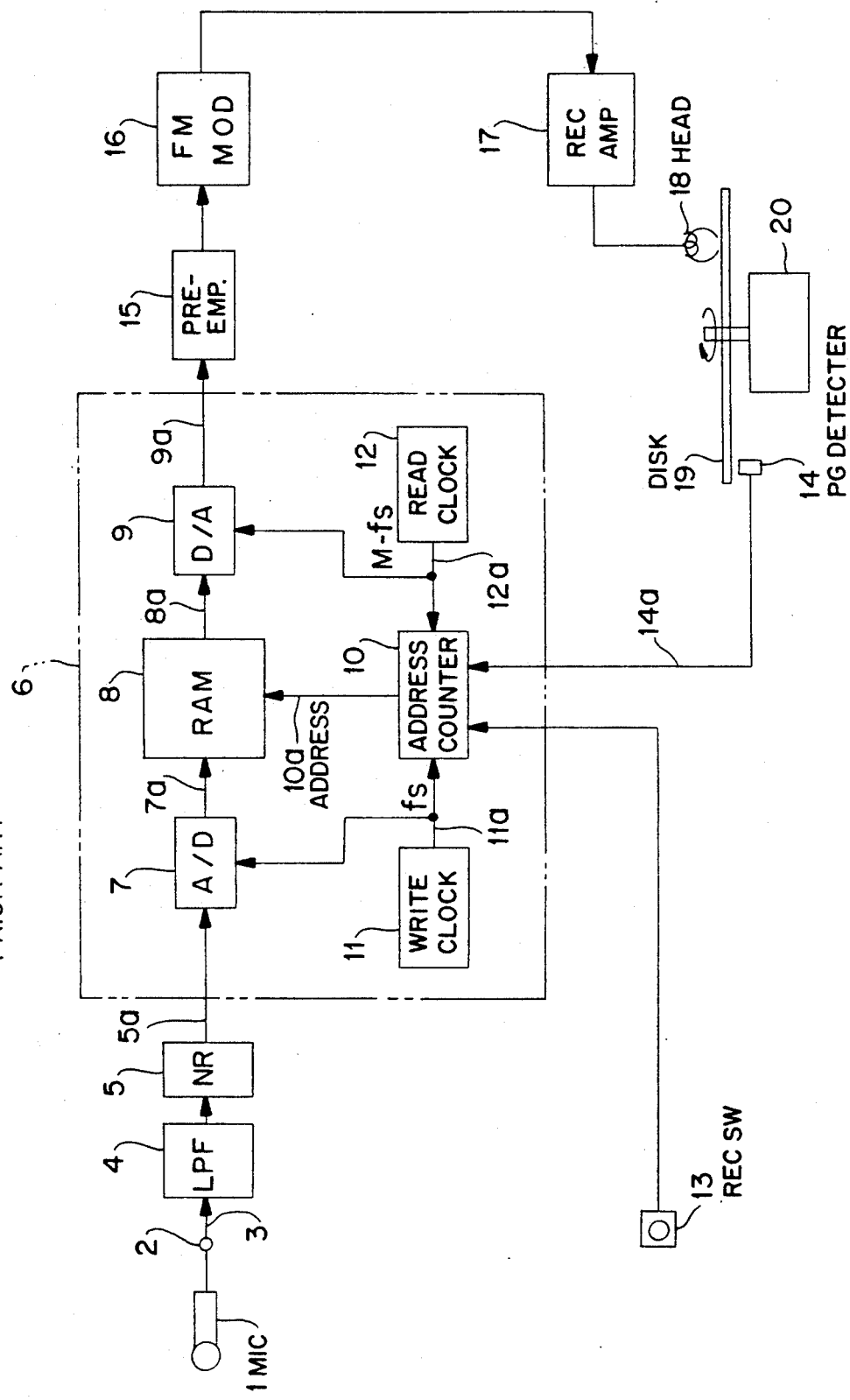
FIG. 11 is a block diagram of a typical recording system.

Next, an example of a reproduction system using a common RAM will be described with reference to FIG. 10. It is assumed that two types of signals are recorded on a track of the floppy disk 19, as shown in FIG. 3.

When a reproduction switch 149 is turned on, a time-compressed analog signal 24a is inputted to an A/D converter 154 of an expansion device 300 through a magnetic head 21, an amplifier 22, a frequency demodulator 23, and a de-emphasis circuit 24. The A/D converter 154 is operated by a clock signal 158a having a frequency of M·fs from a clock generator 158. A digital signal 154a from the A/D converter 154 is also stored in a RAM 156. A memory control device 159 advances the write address of the RAM 156 in synchronization with a PG signal 152a to write the digital signal 154a, for example, beginning with one which corresponds to the head of a first sound recording area 120 shown in FIG. 3. Numeral 159a indicates an address signal.

After the completion of writing to the RAM 156, the memory control device 159 changes the order of read addresses from the order of write addresses so as to read the data belonging to the first sound recording area 120 and those the data belonging to the second sound recording area 121 from the RAM 156 alternately at every clock, and supplies the signals to separate D/A converters 161 and 162, respectively. The frequency of a clock signal 160a in this case is twice the frequency of a D/A conversion clock signal, that is 2 fs. The one D/A converter 161 is operated by a signal 174a which is produced by dividing one-half the RAM read clock signal 160a by a frequency divider 174, whereas the other D/A converter 162 is operated by a signal 175a which is produced by phase-inverting the clock signal 174a by an inverter 175. Thus, the two D/A converters 161 and 162 alternately convert the digital signal 156a from the RAM 156 into analog signals using clock signals 174a and 175a having a frequency of fs. Therefore, an analog signal 161a from the one D/A converter 161 corresponds to the signal in the first sound recording area 120, for example, and an analog signal 162a from the other D/A converter 162 corresponds to the signal from the second sound recording area 121. Processing after the D/A converters 161 and 162 is the same as in the sixth Embodiment (FIG. 9). Examples of the relation between the recording time and the clock signal frequency are shown in Table 6.

TABLE 6

| Reproduction time per unit sound signal | Reproduction time sec/track | Write clock M.fs | Read clock 2fs | D/A conversion clock fs | Expansion factor M (times) | Upper limit freq. fv |
|---|---|---|---|---|---|---|
| Abt. 5 sec | Abt. 10 sec | 6.4MHz | 20Hz | 10KHz | 640 | 5KHz |
| Abt. 10 sec | Abt. 20 sec | 6.4MHz | 10KHz | 5KHz | 1280 | 2.5KHz |

As described above in detail, the present invention enables simultaneous recording of sound signals of a plurality of types such as stereo sound signals on a magnetic disk, which can be reproduced using a conventional monaural reproduction device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for recording a plurality of simultaneously inputted sound signals on a recording medium comprising the steps of:
    converting a plurality of analog sound signals simultaneously inputted into a plurality of digital signals;
    storing said plurality of digital signals in memory means;
    reading one of said plurality of digital signals and thereafter reading the next one of said plurality of digital signals from said memory means so that a serially aligned plurality of read digital signals are developed;
    converting said serially aligned plurality of read digital signals into a serially aligned plurality of analog signals in an order corresponding to said step of reading; and
    recording said serially aligned plurality of analog signals on the recording medium.

2. A method as claimed in claim 1, wherein said step of converting said plurality of analog sound signals converts said plurality of analog sound signals by time-division into said plurality of digital signals using a common A/D converter;
    said step of storing said plurality of digital signals stores said plurality of digital signals in a first address order in said memory means comprising a common RAM;
    said stored step of reading one of said plurality of digital signals and thereafter reading the next one of said plurality of digital signals reads said plurality of digital signals from said common RAM in a second address order changed from said first address order; and
    said step of converting said serially aligned plurality of read digital signals converts said serially aligned plurality of read digital signals into said serially aligned plurality of analog signals by a common D/A converter.

3. A method as claimed in claim 1, wherein said step of converting said plurality of analog sound signals converts said plurality of analog sound signals into said plurality of digital signals by first and second A/D converters;
    said step of storing said plurality of digital signals stores said plurality of digital signals in a first address order in said memory means comprising a common RAM;
    said step of reading one of said plurality of digital signals and thereafter reading the next one of said plurality of digital signals reads said plurality of digital signals from said common RAM in a second address order. changed from said first address order; and
    said step of converting said serially aligned plurality of read digital signals converts said serially aligned plurality of read digital signals into said serially aligned plurality of analog signals by a common D/A converter.

4. A method as claimed in claim 1, wherein said step of converting said plurality of analog sound signals converts said plurality of analog sound signals into said plurality of digital signals by first and second A/D converters;
    said step of storing said plurality of digital signals stores said plurality of digital signals in a first address order in said memory means comprising first and second RAMs;
    said step of reading one of said plurality of digital signals and thereafter reading the next one of said plurality of digital signals reads said plurality of digital signals from said first and second RAMs according to said plurality of analog sound signals; and
    said step of converting said serially aligned plurality of read digital signals converts said serially aligned plurality of read digital signals into said serially aligned plurality of analog signals by a common D/A converter.

5. A method as claimed in claim 1, wherein said step of converting said plurality of analog sound signals converts said plurality of analog sound signals into said plurality of digital signals by first and second A/D converters;
said step of storing said plurality of digital signals stores said plurality of digital signals in a first address order in said memory means comprising first and second RAMs;
said step of reading one of said plurality of digital signals and thereafter reading the next one of said plurality of digital signals reads said plurality of digital signals from said first and second RAMs according to said plurality of analog sound signals; and
said step of converting said serially aligned plurality of read digital signals converts said serially aligned plurality of read digital signals into said serially aligned plurality of analog signals by first and second D/A converters.

6. A method as claimed in claim 1, wherein said magnetic disk comprises a standard floppy disk for an electronic still camera.

7. A method for simultaneously reproducing a plurality of sound signals from a recording medium comprising the steps of:
reproducing a serial sequence of said plurality of sound signals from the recording medium;
converting said plurality of sound signals from said step of reproducing into a plurality of digital signals;
storing said plurality of digital signals in memory means;
reading in parallel each of said plurality of digital signals from said memory means so that a plurality of independent digital signals are developed; and
converting each of said plurality of independent digital signals into an analog signal.

8. A method as claimed in claim 7, wherein said step of storing said plurality of digital signals stores said plurality of digital signals in said memory means comprising first and second RAMs according to said plurality of sound signals;
said step of reading in parallel each of said plurality of digital signals simultaneously reads said plurality of digital signals from said first and second RAMs; and
said step of converting each of said plurality of independent digital signals converts said plurality of independent digital signals into said analog signal by first and second D/A converters according to said plurality of sound signals.

9. A method as claimed in claim 7, wherein said step of storing said plurality of digital signals stores said plurality of digital signals in said memory means comprising a common RAM in a first address order;
said step of reading in parallel each of said plurality of digital signals reads from said common RAM by time-division in a second address order changed from said first address order; and
said step of converting each of said plurality of independent digital signals converts said plurality of independent signals into said analog signal by first and second D/A converters.

10. A method as claimed in claim 7, wherein the recording medium comprises a standard floppy disk for an electronic still camera.

11. An apparatus for recording a plurality of simultaneously inputted sound signals on a recording medium comprising:
receiving means for simultaneously receiving a plurality of analog sound signals;
first converting means for converting said plurality of analog sound signals into a plurality of digital signals;
memory means for storing said plurality of digital signals;
reading means for reading one of said plurality of digital signals and thereafter reading the next one of said plurality of digital signals from said memory means and developing a serially aligned plurality of digital signals;
second converting means for converting said serially aligned plurality of read digital signals into a serially aligned plurality of analog signals in an order corresponding to said reading means; and
recording means for recording said serially aligned plurality of analog signals on the recording medium.

12. An apparatus as claimed in claim 11, wherein said first converting means comprises a common A/D converter.

13. An apparatus as claimed in claim 11, wherein said first converting means comprises first and second A/D converters.

14. An apparatus as claimed in claim 11, wherein said memory means comprises a common RAM.

15. An apparatus as claimed in claim 11, wherein said memory means comprises first and second RAMs.

16. An apparatus as claimed in claim 11, wherein said second converting means comprises a common D/A converter.

17. An apparatus as claimed in claim 11, wherein said second converting means comprises first and second D/A converters.

18. A method as claimed in claim 1, wherein said serially aligned recording medium compries a magnetic disk and said serially aligned plurality of analog signals developed by said step of converting said serially aligned plurality of read digital signals are time-based compressed.

19. A method as claimed in claim 1, wherein said serially aligned plurality of analog signals developed by said step of converting said serially aligned plurality of read digital signals are modulated before being recorded.

20. A method as claimed in claim 18, wherein said plurality of analog signals developed by said step of converting said serially aligned plurality of read digital signals are modulated before being recorded.

21. A method as claimed in claims 1, 18, 19 or 20, wherein said memory means comprises a plurality of RAMS;
said step of converting said plurality of analog sound signals comprises a plurality of A/D converters for converting each of said plurality of analog sound signals into said plurality of digital signals;
said step of storing said plurality of digital signals comprises storing each of said plurality of digital signals in one of said plurality of RAMS corresponding thereto;
said step of reading one of said plurality of digital signals and thereafter reading the next one of said plurality of digital signals comprises separately reading one of said plurality digital signals from said one RAM corresponding thereto; and said step of converting said serially aligned plurality of read digital signals comprises converting each of said serially aligned plurality of read digital signals by a plurality of D/A converters corresponding thereto.

22. A method as claimed in claims 1, 18, 19 or 20, wherein said memory means comprises a plurality of RAMS;

said step of converting said plurality of analog sound signals comprises a common A/D converter for converting each of said plurality of analog sound signals into said plurality of digital signals;

said step of storing said plurality of digital signals comprises storing each of said plurality of digital signals in one of said plurality of RAMs corresponding thereto;

said step of reading one of said plurality of digital signals and thereafter reading the next of said plurality of digital signals comprises separately reading each of said plurality of digital signals from one RAM corresponding thereto; and said step of converting said serially aligned plurality of read digital signals comprises converting each of said serially aligned plurality of read digital signals by a common D/A converter.

23. A method as claimed in claims 1, 18, 19 or 20, wherein said memory means comprises a common RAM;

said step of converting said plurality of analog sound signals comprises a plurality of A/D converters for converting each of said plurality of analog sound signals into said plurality of digital signals;

said step of storing said plurality of said signals comprises storing each of said plurality of digital signals in said common RAM;

said step of reading one of said plurality of digital signals and thereafter reading the next of said plurality of digital signals comprises separately reading each of said plurality of digital signals from said common RAM; and said step of converting said serially aligned plurality of read digital signals comprises converting each of said serially aligned plurality of read digital signals by a plurality of D/A converters corresponding thereto.

24. A method as claimed in claims 1, 18, 19, or 20, wherein said memory means comprises a common RAM;

said step of converting said plurality of analog sound signals comprises a common A/D convertor for converting each of said plurality of analog sound signals into said plurality of digital signals;

said step of storing said plurality of digital signals comprises storing each of said plurality of digital signals in said common RAM;

said step of reading one of said plurality of digital signals and thereafter the next of said plurality of digital signals comprises separately reading each of said plurality of digital signals from said common RAM; and said step of converting said serially aligned plurality of read digital signal comprises converting each of said serially aligned plurality of read digital signals by a common D/A converter.

* * * * *